Patented Oct. 10, 1939

2,176,023

UNITED STATES PATENT OFFICE 2,176,023

STABILIZATION OF MILK AND OTHER DAIRY PRODUCTS DERIVED THEREFROM AGAINST PROTEIN AND FAT DECOMPOSITION

Sidney Musher, New York, N. Y., assignor to Musher Foundation Incorporated, New York, N. Y., a corporation of New York No Drawing. Application September 3, 1938, Serial No. 228,454

9 Claims. (Cl. 99—136)

The present invention relates to the stabilization of milk and dairy products derived therefrom by means of finely divided raw or unbleached cereal and grain flours such as oats, barley, rye, maize, wheat, and tapioca, or water- or alcohol soluble extracts of such cereal and grain flours.

The present application is particularly directed to the stabilization of milk and products derived therefrom in which the cereal and grain flour is added to milk or milk product and is primarily incorporated in the aqueous phase of the milk, or product derived therefrom.

According to the present invention, substantially solid dairy products such as butter, cheese, etc., are preferably not directly treated with the cereal flour by coating or dusting, but are derived from milk or cream, the aqueous phase of which has been stabilized by the addition of the cereal flour thereto.

In milk and in various dairy products derived therefrom, there is a suspension of milk fat or butter oil globules, the surfaces of which are coated or protected by protein materials of the nature of casein. The protein materials are also present in the aqueous solution without necessarily being attached to said globules.

It has been found that the stability of these aqueous butter fat emulsions depends to a considerable extent upon the protection or stabilization of the protein or casein like components of the milky fluid to prevent putrefaction or decomposition thereof.

Although the disperse butter fat or butter oil phase also tends to deteriorate, it has been found that such deteriation is not likely to occur where the aqueous phase has been stabilized against protein decomposition.

It has also been found that when the aqueous casein containing phase such as milk or cream has been stabilized against decomposition, the relatively small amount of stabilized protein material which may be carried into later manufactured products such as butter will have the effect of markedly aiding in the protection of such product like butter against "cheesiness" or staleness and will also markedly increase the stability of the butter fat.

In view of the fact that the protein material desirably stabilized is primarily in the water phase of the milk, it has been found undesirable for many purposes to utilize substantially only materials such as the crude vegetable oils or the ground oil containing seeds. These seeds are those which produce free oil on macerating or grinding and generally contain in excess of 50% total glycerides, such as crushed sesame seed, crushed peanuts, etc. These seeds in ground condition carry the stabilizing materials in an oily base which cannot readily be put into solution or dispersion in the aqueous phase of the milk.

Where the crude vegetable oils or crushed oily seeds are dispersed in the milk, such dispersed particles tend to become coated with the protein material and form a disperse phase independent of and which will not tend to coalesce or contact the disperse butter fat phase.

Furthermore, it has been found that the protein coating around the fat globules in the milk is resistant to the penetration of substantially oily materials such as the crude vegetable oils or oily seeds if they be introduced into the milk, and their effectiveness as stabilizers is substantially limited.

It has been found that the substantially non-oil containing raw cereal or grain flours or the water or alcoholic extracts thereof, such as the raw or unbleached or dry milled flours of oats, barley, rye, maize, wheat, buckwheat, rice, tapioca, etc., which flours desirably have not been given any treatment as would inactivate their stabilizing ingredients, or the aqueous or alcohol soluble extracts thereof, when added to milk, cream, or similar aqueous dispersions, most satisfactorily stabilize them against deterioration and also surprisingly stabilize products derived from them, such as butter, cheese, etc.

These cereal flours are low in lecithin and phosphatide content in contradistinction to the oily seeds. It is desirable in all dairy products to hold the lecithin content to a minimum in order to avoid the development of "fishiness" and other deteriorative changes which arise from the decomposition of the lecithin. Moreover, lecithin becomes inactivated at elevated temperatures such as those to which milk and similar products would be subjected during normal processing as in pasteurization.

On the other hand, the raw cereal flours or particularly their water or alcohol soluble extracts, even when added in very small amounts, become increasingly active at elevated temperatures.

A particular advantage of the present invention resides in the fact that whereas the fatty or hydrocarbon soluble extracts or even lecithin are desirably closely adjacent to or in direct contact with the glyceride globules to protect them, the present materials if merely added to or dissolved in the aqueous phase will nevertheless stabilize the disperse fatty phase without necessarily contacting or combining with such fatty phase.

Because of the activity of these cereal flours and their water or alcohol soluble extracts in stabilizing milk and products derived therefrom, it has been found possible to use them in minute amounts, preferably less, for example, than 2% and desirably less than 1%. In general the flours should be used in amounts of not more than 3%.

For example, 0.5% of oat or maize flour will satisfactorily stabilize ice cream of any flavor such as vanilla, strawberry, etc., while 0.2% of oat or maize flour will satisfactorily stabilize milk, and 0.3% to 0.4% of oat or maize flour will stabilize cream and butter manufactured from it. The stability which is given to milk or other milk product is carried without substantial loss into products derived therefrom such as butter, cream cheese, Cheddar cheese, and sour cream, regardless of whether such products have been subjected to neutralization, pasteurization, centrifuging, churning, homogenization, or other processing.

Moreover, the raw cereal and grain flours give a physical stability to certain dairy products. For example, in connection with ice cream, sherbets, or whipping cream to which a small percentage of one of these cereal stabilizers is added, it is possible to reduce or altogether eliminate the foreign colloids which may be added, such as gelatin, sodium alginate, etc. This advantage is not obtained by the addition of the crude vegetable oils, lecithin, or the oily seeds. On the other hand, the latter materials tend to reduce the whipping ability and act as deterrents to overrun of the dairy products.

Whereas the dry flours may be added in amounts as small as 0.1% to 0.3%, the extracts, on the other hand, may be added in even smaller quantities particularly when concentrated or evaporated to solid condition. For example, where one pound of oat flour or pulverized oats is mixed with two gallons of water and the solid material permitted to settle out or otherwise removed as by centrifuging, the residual liquid may be added directly to milk or cream. Upon evaporation of the residual solution to dryness, particularly under vacuum, the dried residue may be added in amounts under 0.1% to obtain a very high stability. The alcohol soluble extract may also be similarly utilized.

Such extracts become even increasingly active, when the product to which they are added is processed at elevated temperatures such as at 200° F. or higher.

Where the dry cereal flours are used, they may, if desired, be removed by filtration, settling or other process, without loss of the protective action and frequently even greater protective action is obtained when the flour is removed than when left intact in the milk or similar product. This materially differentiates from the use of the crude vegetable oils which, when dispersed, cannot be removed. For example, when 0.3% of oat flour is added to cream in the manufacture of butter, the flour is removed during the churning and washing processes, but the protective action is retained in the flour free butter. This method of treating cream to stabilize the butter made therefrom is much more satisfactory than directly treating the butter.

The exact percentage of oat flour or other cereal flour, or of its water or alcohol soluble extract which is to be added is controlled by commercial and processing factors, etc.

When a milk product is treated in accordance with this invention, that milk product will retain its stabilized characteristics even when used with other materials as, for example, when 0.1% of oat flour is added to milk to be used as the basis in the manufacture of oleomargarine.

The water or alcohol soluble extracts of the cereals and grains are differentiated from the hydrocarbon soluble extracts of those cereals and grains in that the hydrocarbon soluble extracts are not directly miscible with the aqueous phase of the milk or milk product.

The following experiments are exemplary of the activity of the cereal and grain flours and their water and alcohol soluble extracts:

1. 0.3% by weight of a finely ground dehulled oat flour was added to cream containing 35% butter fat. The cream was pasteurized, churned, washed and butter entirely free of oat flour removed therefrom. Scoring was conducted as indicated below, it being understood that the normal scoring of butter varies only from about 87 to 94.

|  | Butter made from regular cream | Butter made from cream containing 0.3% oat flour |
|---|---|---|
| At end of 0 weeks | 91.5 | 91.5 |
| At end of 5 weeks at 50° F | 89.0, cheesy off flavor with very slight tallowiness. | 90.5 |

2. 1 pound of pulverized whole oats was mixed with 1½ gallons of water at 130° F. The oat flour solids were allowed to settle out by standing for 2 hours. The supernatant water portion was decanted and added to a 35% cream on the basis of 0.3% of the original weight of the pulverized whole oats against the weight of the cream. The cream was then neutralized, pasteurized, churned, and washed in the usual manner. The butter obtained from cream treated in this manner was compared in score with butter made from the same cream processed without the water extract of pulverized whole oats, the results of the scoring being as follows:

|  | Butter made from untreated cream | Butter made from cream to which the water extract of pulverized whole oats had been added |
|---|---|---|
| At end of 0 weeks | 90.0, slightly unclean flavor. | 90.5, clean flavor. |
| At end of 3 weeks at 50° F. | 88.0 | 89.75 |

3. 0.1% of dry milled, finely ground maize flour was added to milk containing 3.5% butter fat and which milk had been contaminated with 2 p. p. m. of copper in the form of copper sulphate. The maize flour solids were allowed to settle out and only the supernatant milk portion was used for testing as against the same copper contaminated milk to which no maize flour had been added. The results were as follows, the intensity of the development of off flavor being indicated by the number of +'s shown.

|  | Copper contaminated milk without maize flour | Copper contaminated milk with maize flour |
| --- | --- | --- |
| At end of 0 hours | − | − |
| At end of 48 hours | +++ | ± |

4. A strawberry ice cream was manufactured using 0.5% of gelatin as a physical stabilizer. The same strawberry ice cream mix was also prepared with only 0.2% of gelatin and 0.5% of oat flour. There was substantially no difference in the body or physical properties of these ice creams, the oat flour having acted to replace in part the gelatin content. Scorings were conducted at the close of 0, 2, and 4 months, as indicated below, the intensity of the development of off flavor being indicated by the number of +'s shown.

|  | Ice cream made with 0.5% gelatin without oat flour | Ice cream made with 0.2% gelatin and 0.5% oat flour |
| --- | --- | --- |
| At end of 0 months | − | − |
| At end of 2 months | + | − |
| At end of 4 months | +++ | ± |

The present application is a continuation-in-part of application, Serial No. 97,461 filed August 22, 1936.

The present application is particularly directed to stabilizing aqueous dairy products such as milk, ice cream and cream and also butter made therefrom, by adding thereto a small amount of a finely divided raw unbleached cereal. In copending application, Serial No. 249,990, filed January 9, 1939, there is covered the addition of the water extracts of the finely divided unbleached cereals to aqueous food compositions such as to milk, cream and ice cream.

Having described my invention, what I claim is:

1. An aqueous dairy product, containing butterfat in the discontinuous phase and water in the continuous phase, substantially stabilized against oxidative deterioration by having a small amount, less than 2%, of a finely divided substantially raw unbleached cereal in the aqueous phase thereof.

2. A dairy cream, containing butterfat in the discontinuous phase and water in the continuous phase, substantially stabilized against oxidative deterioration by having a small amount, less than 2%, of a finely divided raw unbleached cereal in the aqueous phase thereof.

3. Ice cream, containing butterfat in the discontinuous phase and water in the continuous phase, substantially stabilized against oxidative deterioration by having a small amount, less than 2%, of a finely divided substantially raw unbleached cereal in the aqueous phase thereof.

4. Strawberry ice cream, containing butterfat in the discontinuous phase and water in the continuous phase, substantially stabilized against oxidative deterioration by having a small amount, less than 2%, of a finely divided raw unbleached cereal selected from the group consisting of oats and maize in the aqueous phase thereof.

5. A process of substantially stabilizing an aqueous dairy product, containing butterfat in the discontinuous phase and water in the continuous phase, against oxidative deterioration, which comprises adding a small amount, less than 2%, of a finely divided raw unbleached cereal to the aqueous phase thereof.

6. A process of substantially stabilizing ice cream, containing butterfat in the discontinuous phase and water in the continuous phase, against oxidative deterioration, which comprises adding a small amount, less than 2%, of a finely divided raw unbleached cereal to the aqueous phase thereof.

7. A process of substantially stabilizing a dairy cream, containing butterfat in the discontinuous phase and water in the continuous phase, against oxidative deterioration, which comprises adding a small amount, less than 2%, of a finely divided raw unbleached cereal to the aqueous phase thereof.

8. A process of making butter resistant to oxidative deterioration which comprises adding to the aqueous phase of cream, containing butterfat in the discontinuous phase and water in the continuous phase, a small amount, less than 2%, of a finely divided raw unbleached cereal and then churning to make butter.

9. A process of making butter resistant to oxidative deterioration which comprises adding to the aqueous phase of cream, containing butterfat in the discontinuous phase and water in the continuous phase, a small amount, less than 2%, of a finely divided raw unbleached cereal selected from the group consisting of oats and maize and then churning to make butter.

SIDNEY MUSHER.